United States Patent
Sun

(10) Patent No.: US 9,503,200 B2
(45) Date of Patent: Nov. 22, 2016

(54) COMMUNICATION SYSTEM AND TRANSFER METHOD THEREOF

(71) Applicant: Nuvoton Technology Corporation, Hsinchu (TW)

(72) Inventor: ChiYung Sun, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 289 days.

(21) Appl. No.: 14/166,106

(22) Filed: Jan. 28, 2014

(65) Prior Publication Data

US 2014/0348344 A1 Nov. 27, 2014

(30) Foreign Application Priority Data

May 22, 2013 (TW) .............................. 102118000 A

(51) Int. Cl.
*H04B 11/00* (2006.01)

(52) U.S. Cl.
CPC ...................... *H04B 11/00* (2013.01)

(58) Field of Classification Search
CPC ........................................................ H04B 1/06
USPC ................ 375/132, 260, 267, 295, 324, 316
See application file for complete search history.

(56) References Cited

U.S. PATENT DOCUMENTS

| | | | | |
|---|---|---|---|---|
| 4,425,666 A * | 1/1984 | Groth, Jr. | ................. | H04L 27/10 341/54 |
| 5,640,415 A * | 6/1997 | Pandula | ................. | H04B 1/713 375/133 |
| 2003/0114122 A1 * | 6/2003 | Strakovsky | .......... | H04B 7/2621 455/92 |
| 2004/0170381 A1 * | 9/2004 | Srinivasan | .......... | G10L 19/0212 386/338 |

FOREIGN PATENT DOCUMENTS

| | | |
|---|---|---|
| CN | 102611658 A | 7/2012 |
| TW | 201220299 | 5/2012 |
| TW | 201220299 A1 * | 5/2012 |

OTHER PUBLICATIONS

Office Action of corresponding TW application No. 102118000 issued on Jan. 16, 2015.
Glass, A. et al., "Design and modeling of H-ternary line encoder for digital data transmission", *2001 International Conferences on Info-tech and Info-net Proceedings. ICII 2001*—Beijing, vol. 2 pp. 503-507.

* cited by examiner

*Primary Examiner* — Freshteh N Aghdam
(74) *Attorney, Agent, or Firm* — Muncy, Geissler, Olds & Lowe, P.C.

(57) ABSTRACT

A communication system is provided. A receiver receives a plurality of audio signals, wherein a frequency of each of the audio signals is selected from a frequency group formed by at least three frequencies. A signal detector coupled to the receiver is configured to obtain the frequency of each of the audio signals. A processor coupled to the signal detector is configured to convert the frequency of each of the audio signals into a digital signal having a first logic level or a second logic level. Two adjacent audio signals of the audio signals have different frequencies, and at least one frequency of the frequency group is used to dynamically represent the first logic level or the second logic level.

10 Claims, 11 Drawing Sheets

|  | BD1 "0" | BD2 "1" | BD3 "1" | BD4 "0" | BD5 "1" |
|---|---|---|---|---|---|
| Tone-A | — | ∨ | — | — | ∨ |
| Tone-B | ∨ | — | ∨ | — | — |
| Tone-C | — | — | — | ∨ | — |

FIG. 11

COMMUNICATION SYSTEM AND TRANSFER METHOD THEREOF

CROSS REFERENCE TO RELATED APPLICATIONS

This Application claims priority of Taiwan Patent Application No. 102118000, filed on May 22, 2013, the entirety of which is incorporated by reference herein.

BACKGROUND OF THE INVENTION

Field of the Invention

The invention relates to a communication system, and more particularly, to an audio communication system.

Description of the Related Art

In an audio communication system, high-frequency signals (e.g. >15.8 KHz) are used to transmit data, wherein the high-frequency signals are difficult to identify by the human ear. In general, the audio signal may be a single tone signal or a multi-tone signal. Therefore, a receiving apparatus can obtain data or instructions from a transmitting apparatus by detecting the tones (i.e. frequencies) of the audio signals.

However, an audio signal will be reflected by the obstacles in the environment when an audio signal is transmitting, such that a time difference between the reflected signal and the audio signal will be generated when the signals arrive at the receiving apparatus, thereby causing interference. For example, the receiving apparatus may simultaneously receive the audio signals transmitted at different time, so that the receiving apparatus can not identify the received audio signals. Thus, a detection-accuracy rate is decreased. Traditionally, the reflecting power of the previous audio signals is attenuated by adding a period of silence between two adjacent audio signals so as to avoid interference of the current audio signal. However, the added silence will extend the total time needed for data transfer, and thus the data-transmission rate is decreased.

BRIEF SUMMARY OF THE INVENTION

Communication systems and signal transfer methods thereof are provided. An embodiment of a communication system is provided. The communication system comprises a receiving apparatus. The receiving apparatus comprises: a receiver, receiving a plurality of audio signals, wherein a frequency of each of the audio signals is selected from a frequency group formed by at least three frequencies; a signal detector coupled to the receiver, obtaining the frequency of each of the audio signals; and a first processor coupled to the signal detector, converting the frequency of each of the audio signals into a digital signal having a first logic level or a second logic level. Two adjacent audio signals of the audio signals have different frequencies, and at least one frequency of the frequency group is used to dynamically represent the first logic level or the second logic level.

Furthermore, an embodiment of a signal transfer method for a communication system is provided. A frequency of a first audio signal is obtained from a frequency group according to a first digital signal. A frequency of a second audio signal is obtained from the frequency group according to a second digital signal. At least one frequency of the frequency group is used to dynamically represent the first digital signal or the second digital signal, and when the first and second audio signals are two adjacent audio signals, the first and second audio signals have different frequencies.

Moreover, another embodiment of a communication system is provided. The communication system comprises a transmitting apparatus. The transmitting apparatus comprises: a processor, providing information; a signal generator coupled to the processor, receiving the information and generating a plurality of audio signals according to the information, wherein a frequency of each of the audio signals is selected from a frequency group formed by at least three frequencies; and a transmitter, sequentially transmitting the audio signals to a receiving apparatus. Two adjacent audio signals of the audio signals have different frequencies, and at least one frequency of the frequency group is used to dynamically represent a first logic level or a second logic level.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 11 shows a schematic diagram illustrating a frequency of an audio signals corresponding to each bit, wherein the frequencies are obtained from a frequency group FG according to the signal transfer method of FIG. 10.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
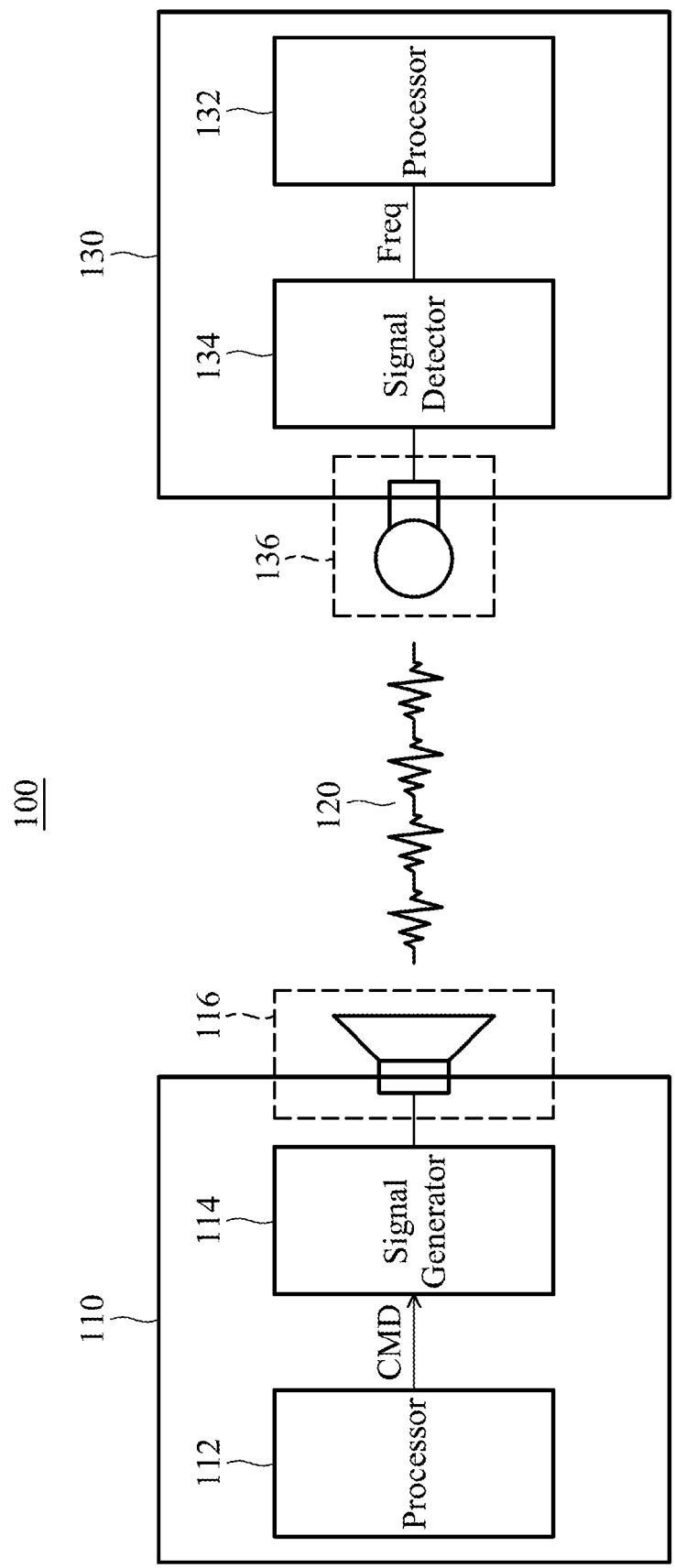
FIG. 1 shows a communication system according to an embodiment of the invention.

FIG. 1 shows a communication system 100 according to an embodiment of the invention. The communication system 100 includes a transmitting apparatus 110 and a receiving apparatus 130. The transmitting apparatus 110 includes a processor 112, a signal generator 114 and a transmitter 116. The processor 112 provides information having a plurality of bits to the signal generator 114, wherein the information includes data and/or instruction CMD, such as commands, to be transmitted to the receiving apparatus 130, and in the following embodiments will take instruction CMD as an example. In one embodiment, the processor 112 successively provides each bit of the instruction CMD to the signal generator 114. Next, according to the logic level of each bit of the instruction CMD, the signal generator 114 generates the corresponding audio signal 120 to the receiving apparatus 130 via the transmitter 116, wherein the frequency of each audio signal 120 is obtained dynamically from a frequency group FG. In other words, the assignation between each bit and the corresponding frequency is dynamic, not fixed. For example, an 18 KHz frequency can be used to represent a bit having the value "1" or "0". In the embodiment, the transmitter 116 may be a speaker, a buzzer or a beeper. A buzzer or a beeper is an audio signaling device, which may be mechanical, electromechanical, or piezoelectric. For instance, a buzzer may be a piezo-buzzer. In one embodiment, the signal generator 114 may be a digital-to-analog converter (DAC) or a pulse-width modulator, to provide a pulse-width modulation (PWM) signal or a combination of the PWM signal and the audio signal to the receiving apparatus 130. The receiving apparatus 130 includes a processor 132, a signal detector 134 and a receiver 136. Through the receiver 136, the signal detector 134 detects and filters each audio signal 120 from the transmitting apparatus 110 so as to obtain the frequency Freq of each audio signal 120. The audio signal 120 from the transmitting apparatus 110 may experience interference due to noise, and it will cause distortion of the audio signal 120, such that the frequency of the audio signal 120 will not be identified by the signal detector 134. Furthermore, the receiving apparatus 130 may also receive signals from other apparatuses (i.e. invalid signals). Therefore, the signal detector 134 can detect and filter each audio signal 120 from the transmitting apparatus 110. If it is determined that the frequency Freq of the audio signal 120 belongs to the frequencies of the frequency group FG, the processor 132 obtains the logic level of the bit of the instruction CMD corresponding to the audio signal 120 according to the frequency Freq. Therefore, after all of the audio signals 120 are received, the receiving apparatus 130 can obtain the instruction CMD from the transmitting apparatus 110 for successive operations. In the embodiment, the receiver 136 can be a microphone.

Figure 2:
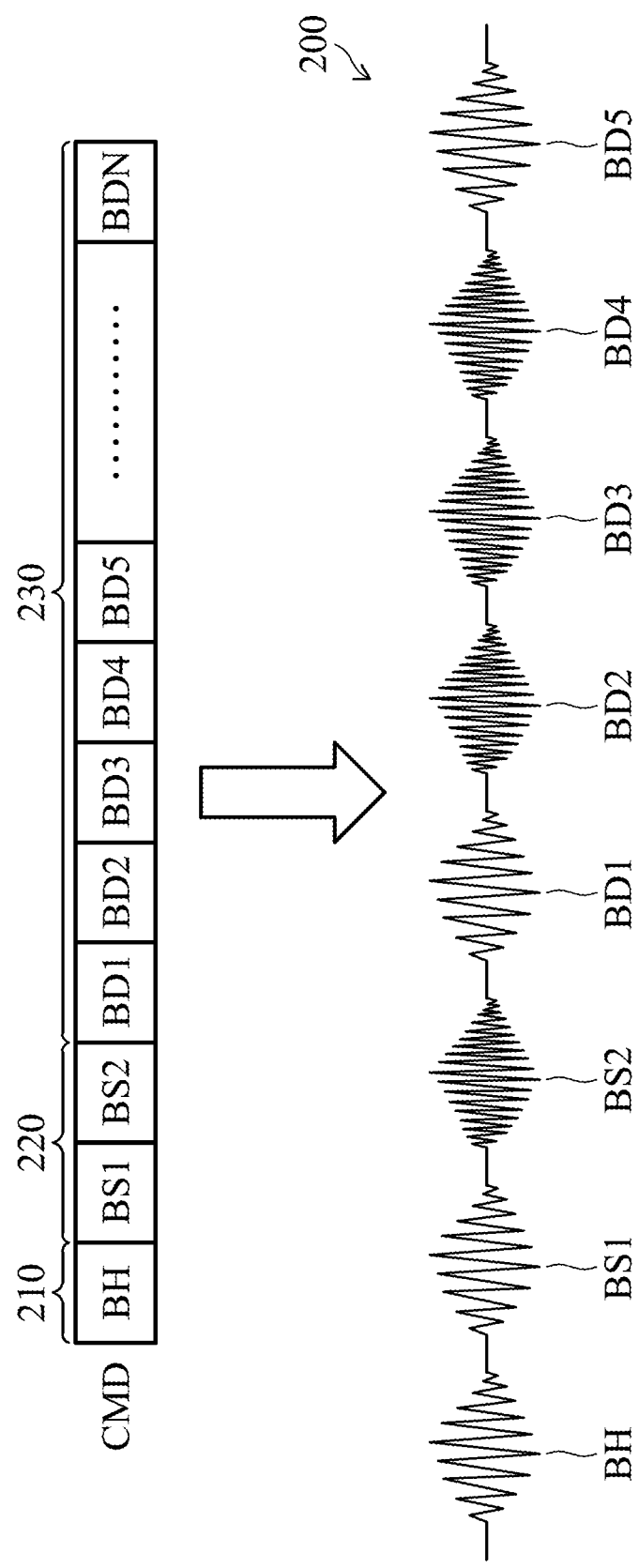
FIG. 2 shows a format of an instruction CMD according to an embodiment of the invention.

FIG. 2 shows the format of an instruction CMD according to an embodiment of the invention. In the embodiment, the instruction CMD includes a header field 210, a synchronization field 220 and a data field 230. The header field 210 includes a header bit BH. The synchronization field 220 includes the synchronization bits BS1 and BS2. The data field 230 includes a plurality of data bits BD1-BDN. In one embodiment, the data field 230 can be formed by 8 data bits. Therefore, according to the logic level of each bit of the instruction CMD, a transmitting apparatus may dynamically obtain a frequency corresponding to the logic level of the bit from the frequency group FG, i.e. the frequency corresponding to the logic level of the bit can be changed dynamically so as to generate a signal having the obtained frequency to a receiving apparatus, as shown in the audio signal 200.

Moreover, the quantity of header bits and the quantity of synchronization bits are determined according to actual applications. For example, a plurality of header bits can be used to represent identification information (e.g. an identification code), or the header bits can be used to represent the number of bits in the instruction CMD and the synchronization bits that are successively transmitted. Furthermore, the receiving apparatus 130 can also detect the peak of the synchronization bit and the number of synchronization bits, and then the receiving apparatus 130 can pre-determine a valid period for the data bits transmitted by the transmitting apparatus 110 so as to decrease the total computational load, thereby decreasing power consumption. Moreover, the method for transmitting the header bits and the synchronization bits is the same as that of the data bits.

Figure 3:
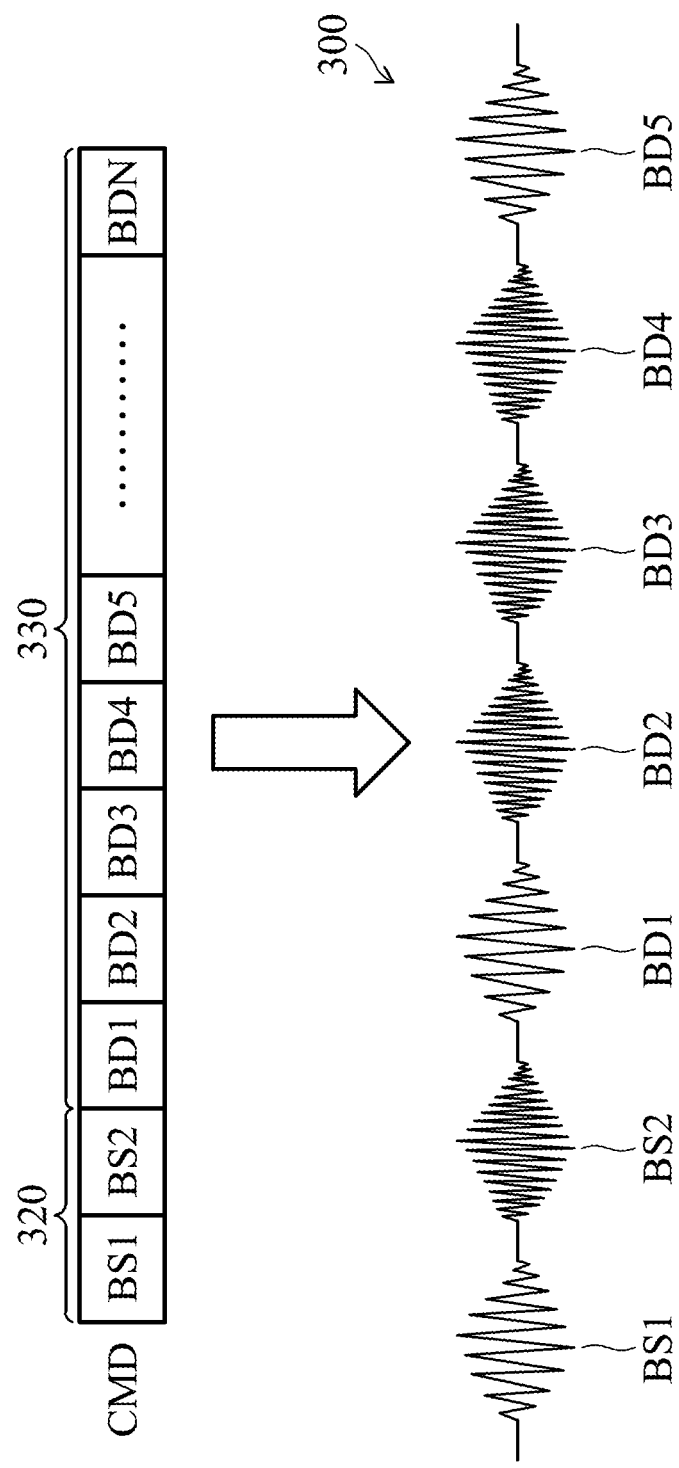
FIG. 3 shows a format of an instruction CMD according to another embodiment of the invention.

FIG. 3 shows a format of an instruction CMD according to another embodiment of the invention. Compared with FIG. 2, the instruction CMD of FIG. 3 only includes a synchronization field 320 and a data field 330. As described above, the synchronization field 320 includes the synchronization bits BS1 and BS2. The data field 330 includes a plurality of data bits BD1-BDN. In one embodiment, the data field 330 is formed by 8 data bits. Therefore, according to the logic level of each bit of the instruction CMD, a transmitting apparatus may dynamically obtain the frequency corresponding to the logic level of the bit from the frequency group FG so as to generate a signal having that frequency to a receiving apparatus, as shown in the audio signal 300. Moreover, it should be noted that the quantity of synchronization bits can be determined according to actual applications.

Figure 4:
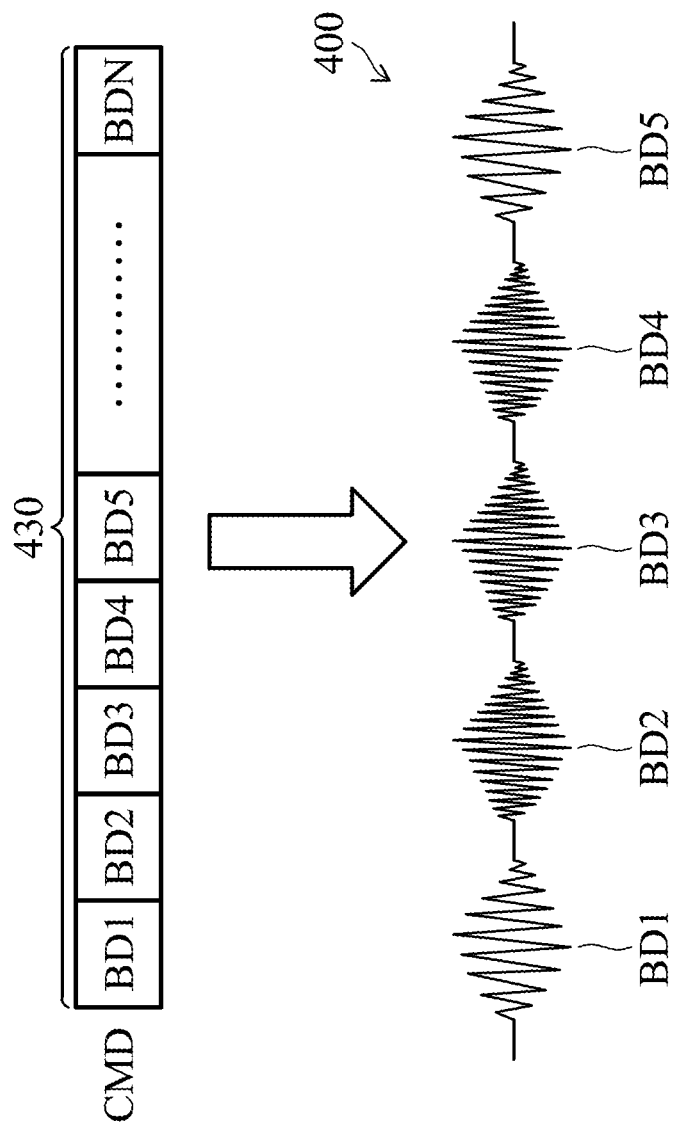
FIG. 4 shows a format of an instruction CMD according to another embodiment of the invention.

FIG. 4 shows the format of an instruction CMD according to another embodiment of the invention. Compared with FIG. 2, the instruction CMD of FIG. 4 only includes a data field 430. The data field 430 includes a plurality of data bits BD1-BDN. In one embodiment, the data field 430 is formed by 8 data bits. Therefore, according to the logic level of each bit of the instruction CMD, a transmitting apparatus may dynamically obtain a frequency corresponding to the logic level of the bit from the frequency group FG so as to generate a signal having that frequency to a receiving apparatus, as shown in the audio signal 400.

In one embodiment, each frequency of the frequency group FG can be used to represent a plurality of bits. For example, the first frequency of the frequency group FG can be used to represent the bit pair "00"; the second frequency can be used to represent the bit pair "01"; the third frequency can be used to represent the bit pair "10"; and the fourth frequency can be used to represent the bit pair "11".

Figure 5:
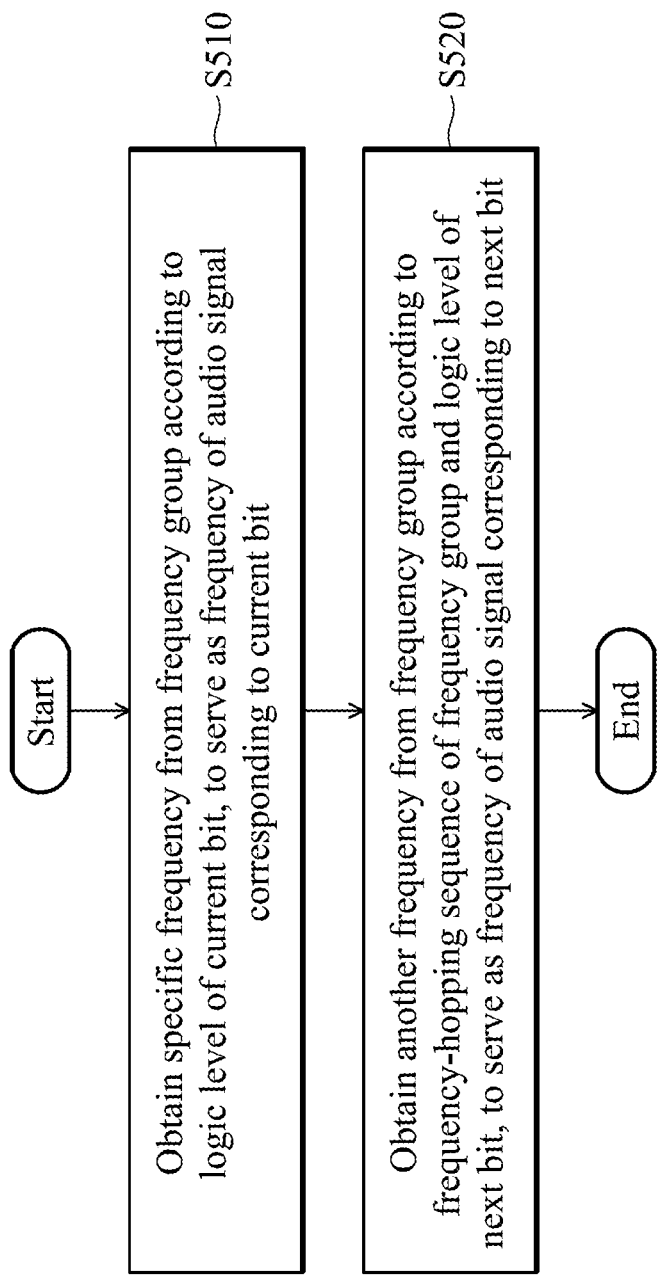
FIG. 5 shows a signal transfer method for an audio communication system according to an embodiment of the invention.
Figure 6:
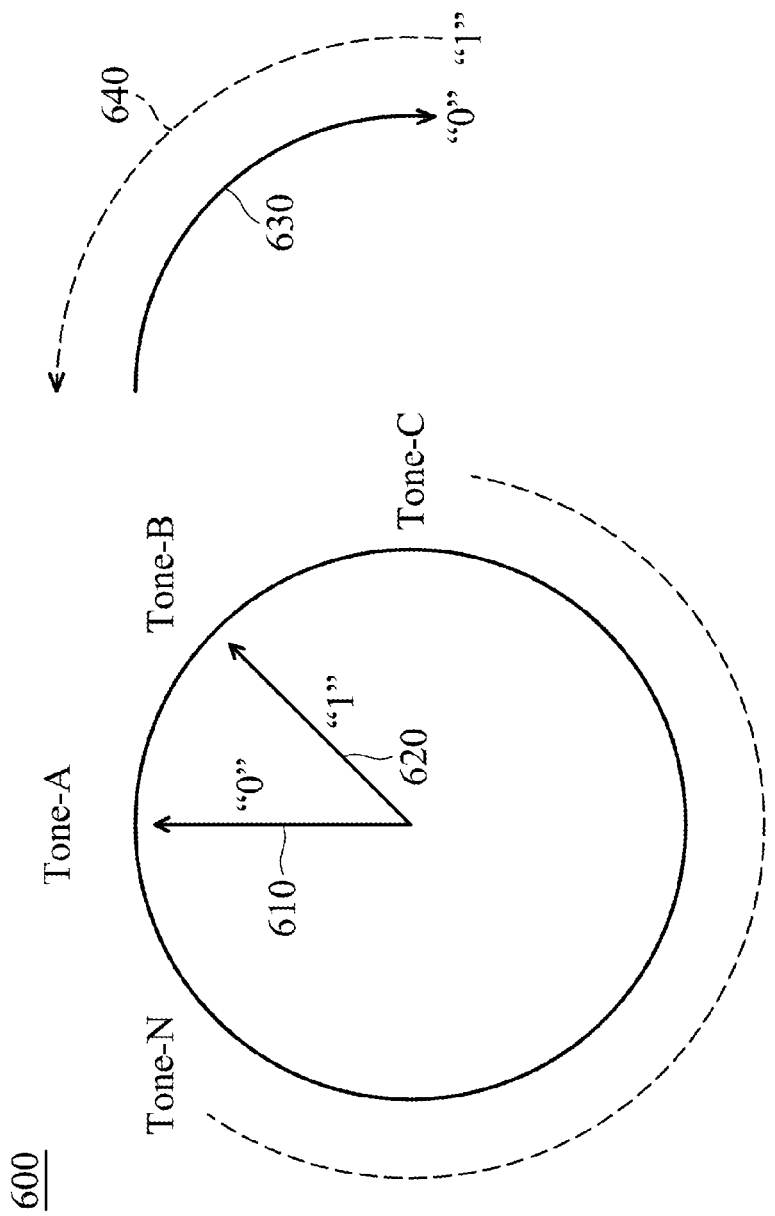
FIG. 6 shows a schematic illustrating a frequency of an audio signal corresponding to current bit that is obtained from a frequency group according to the signal transfer method of FIG. 5.
Figure 7:
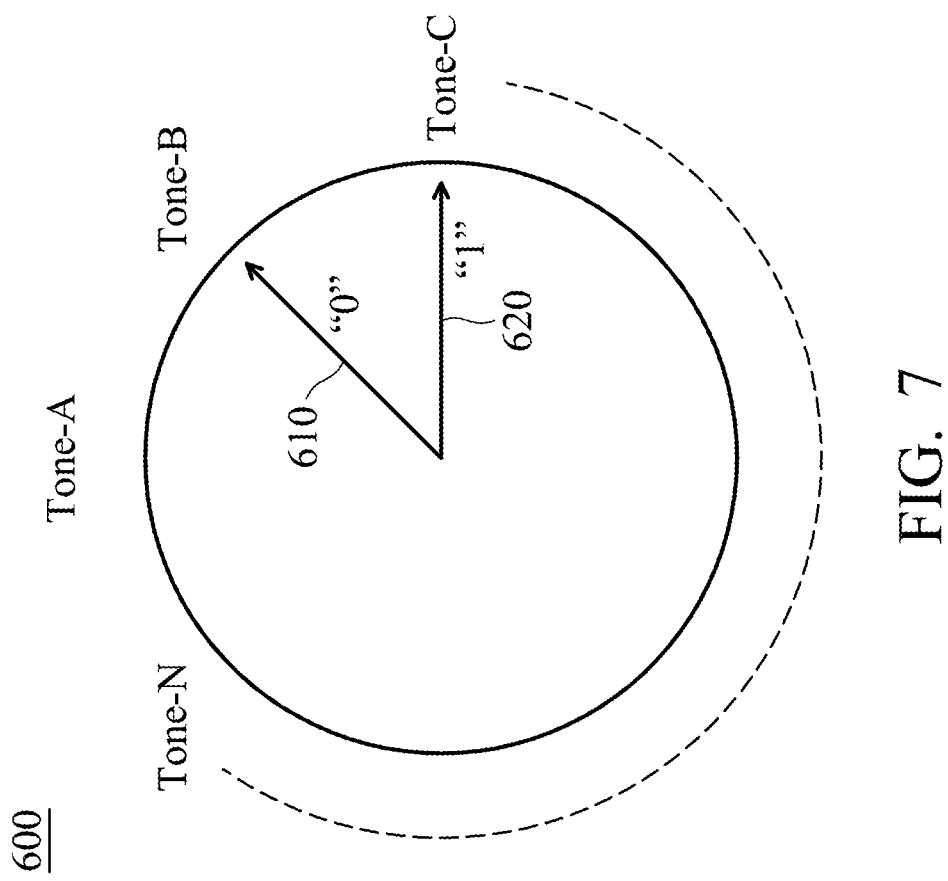
FIG. 7 shows an example illustrating a frequency of an audio signal corresponding to the next bit that is obtained from the frequency group according to the signal transfer method of FIG. 5.
Figure 8:
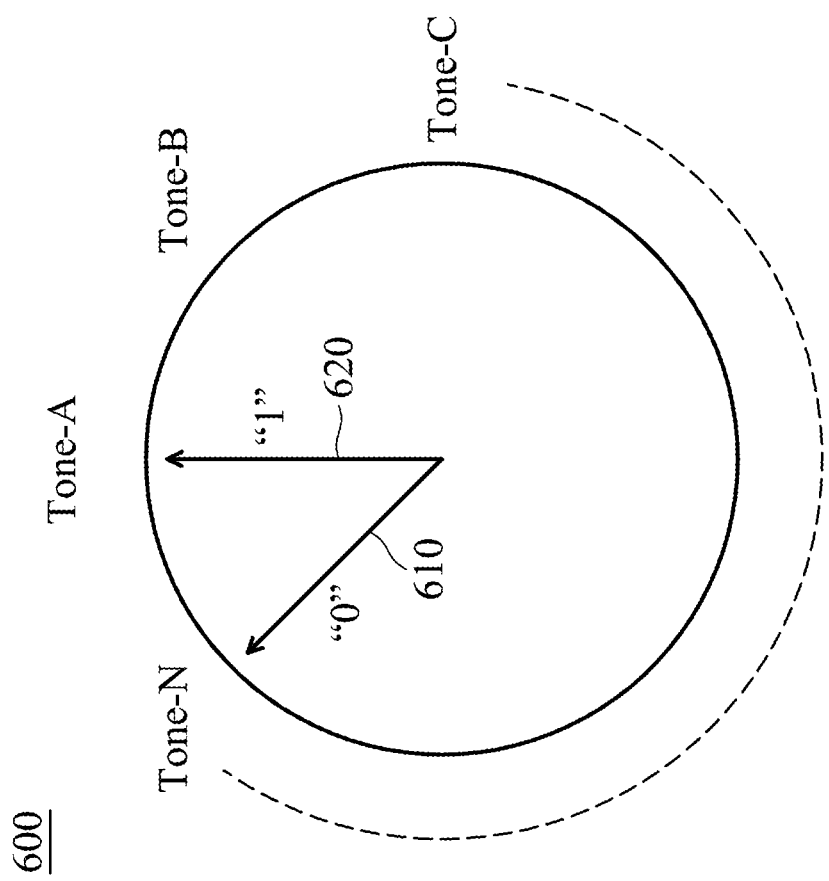
FIG. 8 shows another example illustrating a frequency of an audio signal corresponding to the next bit that is obtained from the frequency group according to the signal transfer method of FIG. 5.

FIG. 5 shows a signal transfer method for an audio communication system according to an embodiment of the invention. FIG. 6 shows a schematic illustrating a frequency of an audio signal corresponding to current bit Bc that is obtained from a frequency group 600 according to the signal transfer method of FIG. 5. Referring to FIG. 5 and FIG. 6, the frequency group 600 includes a plurality of tones Tone-A to Tone-N, wherein each tone is used to represent a different frequency and the number of tones of the frequency group 600 can be determined according to actual applications. A tone indicator 610 can be used to indicate the tone (i.e. the frequency) corresponding to the current bit Bc having logic level "0", and a tone indicator 620 can be used to indicate the tone (i.e. the frequency) corresponding to the current bit Bc having logic level "1". First, in step S510, according to the logic level of the current bit Bc, a frequency can be obtained from the frequency group 600, which serves as the frequency of the audio signal corresponding to the current bit Bc. For example, in FIG. 6, if the current bit Bc has logic level "0", the frequency of the audio signal corresponding to the current bit Bc is the tone Tone-A, as shown in the tone indicator 610. If the current bit Bc has logic level "1", the frequency of the audio signal corresponding to the current bit Bc is the tone Tone-B, as shown in the tone indicator 620. Simultaneously, the frequency-hopping sequence of the frequency group 600 can be further determined according to the logic level of the current bit Bc. The frequency-hopping sequence circulates from the tones Tone-A to Tone-N in the first direction in sequence (e.g. a clockwise direction as shown in label 630), or from the tones Tone-N to Tone-A in the second direction in sequence (e.g. an anti-clockwise direction as shown in label 640). Specifically, the first direction is opposite to the second direction. Thus, in step S520, according to the frequency-hopping sequence of the frequency group 600 and the logic level of the next bit Bn, another frequency is obtained from the frequency group 600, which serves as the frequency of the audio signal corresponding to the next bit Bn. For example, if the current hit Bc has logic level "0", the tone indicators 610 and 620 of the frequency group 600 rotate in a clockwise direction, as shown in FIG. 7. If the current bit Bc has logic level "1", the tone indicators 610 and 620 of the frequency group 600 rotate in an anti-clockwise direction, as shown in FIG. 8. Furthermore, in one embodiment, the frequency group 600 is formed by a plurality of multi-tone signals, such as the dual-tone multi-frequency (DTMF) signals, i.e. each audio signal has multiple frequencies.

FIG. 7 shows an example illustrating the frequency of an audio signal corresponding to the next bit Bn that is obtained from the frequency group 600 according to the signal transfer method of FIG. 5. Referring to FIG. 1, FIG. 6 and FIG. 7, if the current bit has logic level "0" and the tone Tone-A is used to represent "0" as shown in FIG. 6, the logic level of the next bit Bn is shown in FIG. 7 according to circulation in a clockwise direction, as shown in label 630 of FIG. 6, i.e. the tones Tone-B and Tone-C are used to represent logic level "0" and logic level "1", respectively. In other words, if a first bit B1 and a second bit B2 of the instruction CMD to be transmitted are "00", the signal generator 114 successively provides a first audio signal having the tone Tone-A and a second audio signal having the tone Tone-B to the receiving apparatus 130 via the transmitter 116. After receiving the first audio signal having the tone Tone-A via the receiver 136, the signal detector 134 filters the first audio signal to obtain the tone Tone-A. Due to the transmitting apparatus 110 and the receiving apparatus 130 using the same transfer method and also operating in the same frequency group, the processor 132 obtains logic level "0" "0" according to the tone Tone-A, for the first bit B1. Furthermore, according to the first bit B1 having logic level "0", the processor 132 determines that the frequency-hopping sequence circulates in a clockwise direction. Next, after receiving the second audio signal having the tone Tone-B via the receiver 136, the signal detector 134 filters the second audio signal to obtain the tone Tone-B. Thus, the processor 132 obtains logic level "0" according to the tone Tone-B for the second bit B2. Furthermore, if the first bit B1 and the second bit B2 of the instruction CMD to be transmitted are "01", the signal generator 114 successively provides the first audio signal having the tone Tone-A and the second audio signal having the tone Tone-C to the receiving apparatus 130 via the transmitter 116. After receiving the first audio signal having the tone Tone-A via the receiver 136, the signal detector 134 filters the first audio signal to obtain the tone Tone-A. Thus, the processor 132 obtains logic level "0" according to the tone Tone-A for the first bit B1. Furthermore, according to the first bit B1 having logic level "0", the processor 132 determines that the frequency-hopping sequence circulates in a clockwise direction. Next, after receiving the second audio signal having the tone Tone-C via the receiver 136, the signal detector 134 filters the second audio signal to obtain the tone Tone-C. Thus, the processor 132 obtains logic level "1" according to the tone Tone-C for the second bit B2. Specifically, according to the signal transfer method of FIG. 5, the transmitting apparatus 110 can dynamically obtain the frequency corresponding to the logic level of the bit to be transmitted from the frequency group. Thus, no frequency will be consecutively transmitted twice. Therefore, when the receiving apparatus 130 receives an interference signal (e.g. a reflection of the first audio signal) and the second audio signal at the same time, the receiving apparatus 130 can detect that the frequency of the interference signal and the frequency of the first audio signal are the same. Thus, the processor 132 can determine that the interference signal is a reflected signal of the first audio signal, and the second audio signal is a new signal.

FIG. 8 shows another example illustrating the frequency of an audio signal corresponding to the next bit Bn that is obtained from the frequency group 600 according to the signal transfer method of FIG. 5. Referring to FIG. 1, FIG. 6 and FIG. 8, if the current bit has logic level "1" and the tone Tone-B is used to represent "1" as shown in FIG. 6, the logic level of the next bit Bn is shown in FIG. 8 according to a circulation in an anti-clockwise direction, as shown in label 640 of FIG. 6, i.e. the tones Tone-N and Tone-A are used to represent logic level "0" and logic level "1", respectively. In other words, if the first bit B1 and the second bit B2 of the instruction CMD to be transmitted are "10", the signal generator 114 successively provides the first audio signal having the tone Tone-B and the second audio signal having the tone Tone-N to the receiving apparatus 130 via the transmitter 116. As described above, after the receiver 136 receives the first audio signal having the tone Tone-B, the signal detector 134 filters the first audio signal to obtain the tone Tone-B. Due to the transmitting apparatus 110 and the receiving apparatus 130 using the same transfer method and also operating in the same frequency group, the processor 132 obtains logic level "1" according to the tone Tone-B for the first bit B1. Furthermore, according to the first bit B1 having logic level "1", the processor 132 determines that the frequency-hopping sequence circulates in an anti-clockwise direction. Next, after receiving the second audio signal having the tone Tone-N via the receiver 136, the signal detector 134 filters the second audio signal to obtain the tone Tone-N. Thus, the processor 132 obtains logic level "0" according to the tone Tone-N for the second bit B2. Similarly, if the first bit B1 and the second bit B2 of the instruction CMD to be transmitted are "11", the bits B1 and B2 will be represented as the tones Tone-B and Tone-A, respectively. As described above, the receiving apparatus 130 will convert the audio signals having the tones Tone-B and Tone-A into the corresponding bits. Specifically, according to the signal transfer method of FIG. 5, the transmitting apparatus 110 can dynamically obtain the frequency corresponding to the logic level of the bit to be transmitted from the frequency group. As described above, no frequency will be consecutively transmitted twice.

Figure 9:
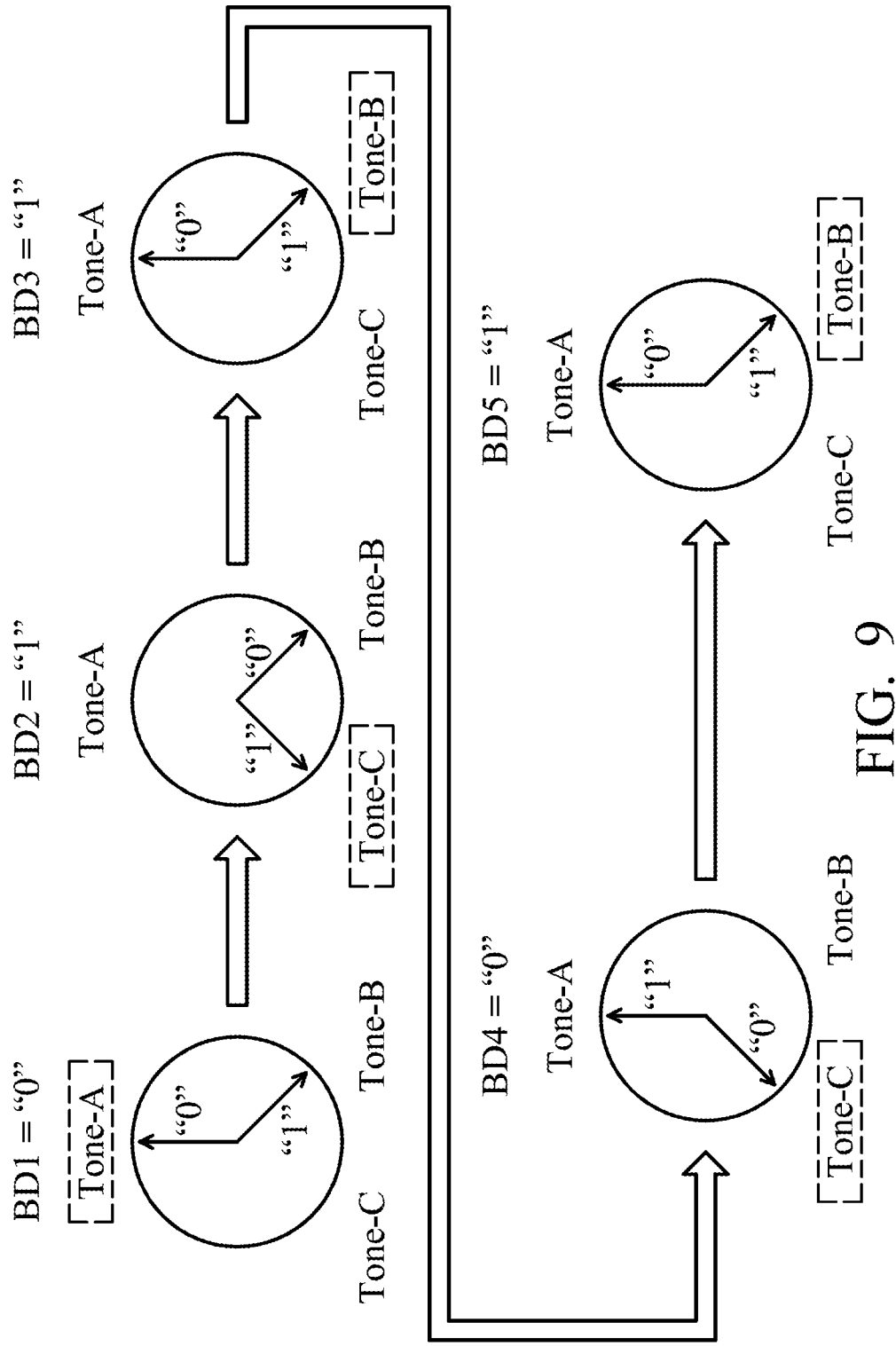
FIG. 9 shows a schematic diagram illustrating a frequency of an audio signals corresponding to each bit, wherein the frequencies are obtained from a frequency group FG according to the signal transfer method of FIG. 5.

FIG. 9 shows a schematic diagram illustrating the frequency of audio signals corresponding to each bit, wherein the frequencies are obtained from a frequency group FG according to the signal transfer method of FIG. 5. In FIG. 9, the frequency group FG includes three tones, Tone-A, Tone-B and Tone-C, having different frequencies. Referring to FIG. 1 and FIG. 9, when a data bit BD1 of the instruction CMD to be transmitted has logic level "0", the signal generator 114 provides a first audio signal having the tone Tone-A to the receiving apparatus 130 via the transmitter 116. Next, in response to the logic level "0", the processor 112 can rotate the tone indicators in a clockwise direction. Next, when a data bit BD2 to be transmitted has logic level "1", the signal generator 114 provides a second audio signal having the tone Tone-C to the receiving apparatus 130 via the transmitter 116. Next, in response to the logic level "1", the processor 112 can rotate the tone indicator in an anti-clockwise direction. Next, when a data bit BD3 to be transmitted has logic level "1", the signal generator 114 provides a third audio signal having the tone Tone-B to the receiving apparatus 130 via the transmitter 116. Next, in response to the logic level "1", the processor 112 can rotate the tone indicator in an anti-clockwise direction. Next, when a data bit BD4 to be transmitted has logic level "0", the signal generator 114 provides a fourth audio signal having the tone Tone-C to the receiving apparatus 130 via the transmitter 116. Next, in response to the logic level "0", the processor 112 can rotate the tone indicator in a clockwise direction. Next, when a data bit BD5 to be transmitted has logic level "1", the signal generator 114 provides a fifth audio signal having the tone Tone-B to the receiving apparatus 130 via the transmitter 116. As described above, due to the transmitting apparatus 110 and the receiving apparatus 130 using the same transfer method and also operating in the same frequency group, the processor 132 can obtain the logic levels of the data bits BD1-BD5 in sequence. Specifically, according to the signal transfer method of FIG. 5, the transmitting apparatus 110 can dynamically obtain the frequency corresponding to the logic level of the bit to be transmitted from the frequency group. Thus, no frequency will be consecutively transmitted twice. Therefore, when the receiving apparatus 130 receives an interference signal (e.g. a reflection of the first audio signal) and the second audio signal at the same time, the receiving apparatus 130 can detect that the frequency of the interference signal and the frequency of the first audio signal are the same. Thus, the processor 132 can determine that the interference signal is a reflection signal of the first audio signal and the second audio signal is a new signal. Therefore, the processor 132 only needs to convert the second audio signal into the corresponding bit, without performing any processes for the interference signal. In the embodiment, the data bits BD2 and BD4 having different logic levels can have the same frequency (i.e. the tone Tone-C). Furthermore, the data bits BD3 and BD5 having the same logic levels can have the same frequency (i.e. the tone Tone-B). Therefore, according to the signal transfer method of FIG. 5, the transmitting apparatus 110 can dynamically obtain the frequency corresponding to the logic level of the bit to be transmitted from the frequency group.

Figure 10:
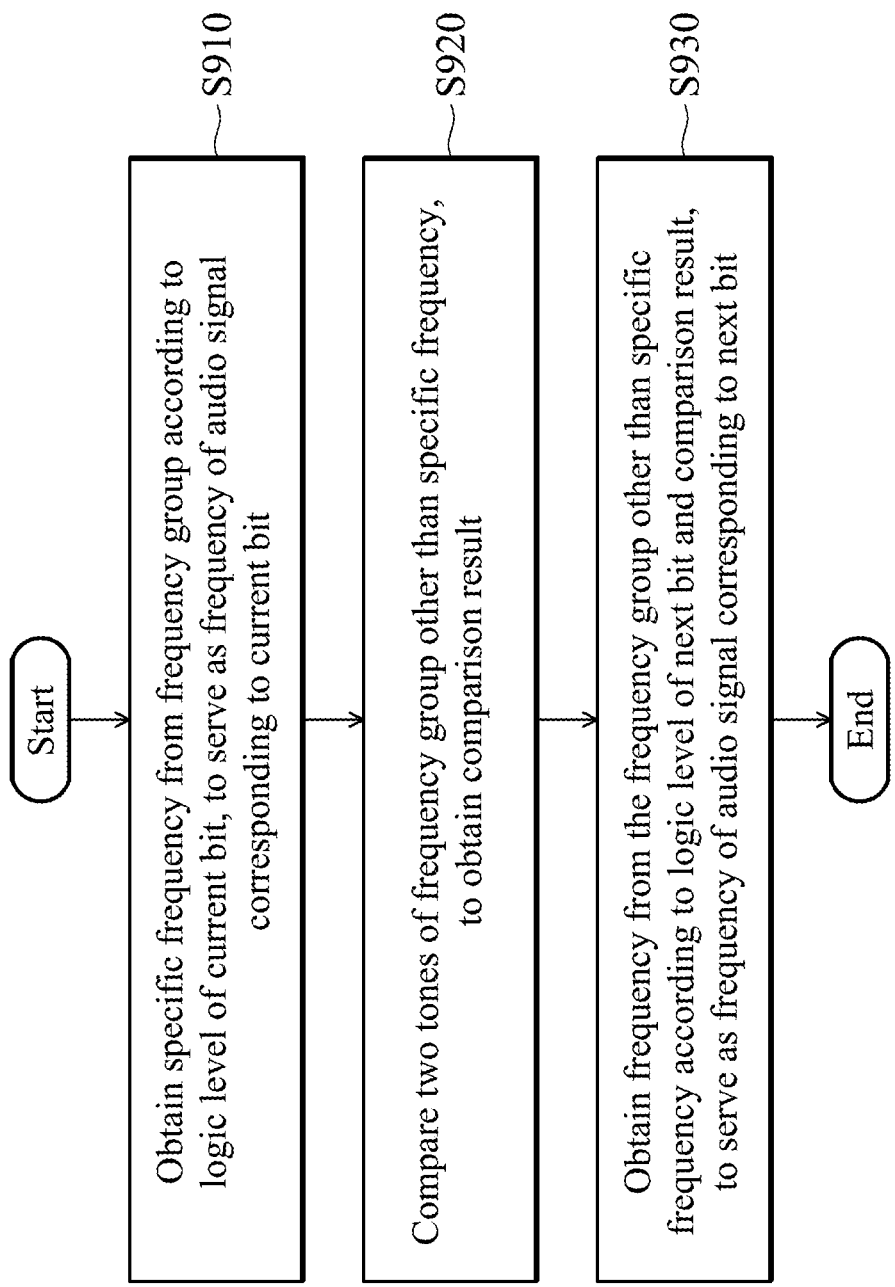
FIG. 10 shows a signal transfer method for an audio communication system according to another embodiment of the invention.

FIG. 10 shows a signal transfer method for an audio communication system according to another embodiment of the invention. First, in step S910, according to the logic level of current bit Bc, a frequency can be obtained from the frequency group FG, which serves as the frequency of the audio signal corresponding to the current bit Bc, wherein the frequency group FG includes three tones, Tone-A, Tone-B and Tone-C, having different frequencies. Next, in step S920, the two tones of the frequency group FG other than the obtained frequency of step S910 are compared, to obtain a comparison result, wherein the comparison result can indicate which tone has a higher frequency. Next, in step S930, according to the logic level of the next bit Bn and the comparison result, a frequency other than the obtained frequency of step S910 is obtained from the frequency group FG, which serves as the frequency of the audio signal corresponding to the next bit Bn. For example, if the frequency of the audio signal corresponding to the current bit Bc is the tone Tone-A, the tones Tone-B and Tone-C are compared to obtain a comparison result in which the tone Tone-B is higher than the tone Tone-C in frequency. Next, if the next bit Bn has a first logic level, the tone Tone-B having a higher frequency can be obtained from the frequency group FG, which can serve as the frequency of the audio signal corresponding to the next bit Bn. Conversely, if the next bit Bn has a second logic level, the tone Tone-C having a lower frequency can be obtained from the frequency group FG, which serves as the frequency of the audio signal corresponding to the next bit Bn, wherein the first and second logic levels are complementary.

FIG. 11 shows a schematic diagram illustrating the frequency of audio signals corresponding to each bit, wherein the frequencies are obtained from a frequency group FG according to the signal transfer method of FIG. 10, In FIG. 11, the frequency group FG includes three tones, Tone-A, Tone-B and Tone-C, having different frequencies (e.g. Tone-A>Tone-B>Tone-C). Referring to FIG. 1 and FIG. 11, when a data bit BD1 of the instruction CMD to be transmitted has logic level "0", the signal generator 114 can provide a first audio signal having the tone Tone-B to the receiving apparatus 130 via the transmitter 116. Next, by comparing the two tones other than the tone Tone-B, the signal generator 114 can obtain a comparison result that the tone Tone-A is higher than the tone Tone-C. In the embodiment, if the t bit has logic level "1", the signal generator 114 can provide the tone having the higher frequency as the frequency of the next audio signal according to the comparison result. Conversely, if the next bit has logic level "0", the signal generator 114 can provide the tone having the lower frequency as the frequency of the next audio signal according to the comparison result. Next, when a data bit BD2 to be transmitted has logic level "1", the signal generator 114 can provide a second audio signal having the tone Tone-A with a higher frequency to the receiving apparatus 130 via the transmitter 116. Next, by comparing the two tones other than the tone Tone-A, the signal generator 114 can obtain a comparison result in which the tone Tone-B is higher than the tone Tone-C. Next, when a data bit BD3 to be transmitted has logic level "1", the signal generator 114 can provide a third audio signal having the tone Tone-B with a higher frequency to the receiving apparatus 130 via the transmitter 116. Next, by comparing the two tones other than the tone Tone-B, the signal generator 114 can obtain a comparison result in which the tone Tone-A is higher than the tone Tone-C. Next, when a data bit BD4 to be transmitted has logic level "0", the signal generator 114 can provide a fourth audio signal having the tone Tone-C with a lower frequency to the receiving apparatus 130 via the transmitter 116. Next, by comparing the two tones other than the tone Tone-C, the signal generator 114 can obtain a comparison result in which the tone Tone-A is higher than the tone Tone-B. Next, when a data bit BD5 to be transmitted has logic level "1", the signal generator 114 can provide a fifth audio signal having the tone Tone-A with a higher frequency to the receiving apparatus 130 via the transmitter 116. In the receiving apparatus 130, after receiving the first audio signal having the tone Tone-B via the receiver 136, the signal detector 134 filters the first audio signal to obtain the tone Tone-B. Due to the transmitting apparatus 110 and the receiving apparatus 130 using the same transfer method and also operating in the same frequency group, the processor 132 can obtain logic level "0" according to the tone Tone-B for the first bit B1. Simultaneously, the processor 132 can compare the two tones other than the tone Tone-B, to obtain a comparison result in which the tone Tone-A is higher than the tone Tone-C. Thus, when the signal detector 134 detects that the frequency of the second audio signal is the tone Tone-A, the processor 132 can determine that the data bit BD2 has logic level "1", and when the signal detector 134 detects that the frequency of the second audio signal is the tone Tone-C, the processor 132 can determine that the data bit BD2 has logic level "0". Therefore, according to the same transfer method, the receiving apparatus 130 can obtain the logic levels of the data bits BD2, BD3, BD4 and BD5 in sequence. Specifically, according to the signal transfer method of FIG. 10, the transmitting apparatus 110 can dynamically obtain the frequency corresponding to the logic level of the bit to be transmitted from the frequency group. Thus, no frequency will be consecutively transmitted twice. Therefore, when the receiving apparatus 130 receives an interference signal (e.g. a reflection of the first audio signal) and the second audio signal at the same time, the receiving apparatus 130 can detect that the frequency of the interference signal and the frequency of the first audio signal are the same. Thus, the processor 132 can determine that the interference signal is a reflection of the first audio signal, and that the second audio signal is a new signal.

In the communication system of some embodiments, the receiver can receive a first audio signal at a first time point and a second audio signal at a second time point, wherein the first and second audio signals which are not adjacent to each other have the same frequencies corresponding to different logic levels.

In some embodiments, the receiver receives a first audio signal and a second audio signal in sequence, and the first processor determines a frequency-hopping sequence according to a logic level of a first digital signal corresponding to the first audio signal, and obtains a second digital signal corresponding to the second audio signal according to the frequency-hopping sequence, wherein the frequency group includes a first frequency, a second frequency, and a third frequency, and the receiving apparatus obtains an instruction according to the first and second digital signals. Furthermore, when the first digital signal has the first logic level, the frequency of the first audio signal is the first frequency, and the frequency-hopping sequence can circulate between the first, second, and third frequencies in the first direction. When the frequency of the second audio signal is the second frequency, the first and second digital signals have the same logic levels. When the frequency of the second audio signal is the third frequency, the first and second digital signals have different logic levels. Furthermore, when the first digital signal has the second logic level, the frequency of the first audio signal is the second frequency and the frequency-hopping sequence can circulate between the second, first, and third frequencies in the second direction, wherein the second direction is opposite to the first direction. When the frequency of the second audio signal is the first frequency, the first and second digital signals have the same logic levels, and when the frequency of the second audio signal is the third frequency, the first and second digital signals have different logic levels.

In some embodiments, the communication system further includes a transmitting apparatus. The transmitting apparatus includes: a second processor, providing an instruction having the first digital signal and the second digital signal; a signal generator coupled to the second processor, receiving the instruction, and sequentially generating the first audio signal and the second audio signal according to the logic levels of the first digital signal and the second digital signal; and a transmitter coupled to the signal generator, sequentially providing the first audio signal and the second audio signal to the receiving apparatus. Furthermore, when the first and second digital signals have the first logic level, the signal generator obtains the first frequency from the frequency group as the frequency of the first audio signal, and obtains the second frequency from the frequency group as the frequency of the second audio signal according to the frequency-hopping sequence, and when the first digital signal has the first logic level and the second digital signal has the second logic level, the signal generator obtains the first frequency from the frequency group as the frequency of the first audio signal, and obtains the third frequency from the frequency group as the frequency of the second audio signal according to the frequency-hopping sequence. Moreover, the transmitter is a speaker or a piezo-buzzer.

In some embodiments, the receiver receives a first audio signal and a second audio signal in sequence, and the first processor obtains a first digital signal and a second digital signal according to the first audio signal and the second audio signal, wherein the frequency group includes a first frequency, a second frequency and a third frequency, wherein the second frequency is higher than the third frequency and the frequency of the first audio signal is the first frequency. When the frequency of the second audio signal is the second frequency, the second digital signal has the first logic level, and when the frequency of the second audio signal is the third frequency, the second digital signal has the second logic level.

In some embodiments, the communication system further includes a transmitting apparatus. The transmitting apparatus includes: a second processor, providing an instruction having the first digital signal and the second digital signal; a signal generator coupled to the second processor, receiving the instruction, and sequentially generating the first audio signal and the second audio signal according to the logic levels of the first digital signal and the second digital signal; and a transmitter coupled to the signal generator, sequentially providing the first audio signal and the second audio signal to the receiving apparatus. Furthermore, the signal generator obtains the first frequency from the frequency group as the frequency of the first audio signal in response to the logic level of the first digital signal, wherein when the second digital signal has the first logic level, the signal generator obtains the second frequency from the frequency group as the frequency of the second audio signal and the second frequency is higher than the third frequency, and when the second digital signal has the second logic level, the signal generator obtains the third frequency from the frequency group as the frequency of the second audio signal and the third frequency is lower than the second frequency.

In the signal transfer method of some embodiments, the first and second audio signals are two audio signals that are present at different time points, wherein the first and second audio signals have the same frequencies corresponding to a first logic level and a second logic level, respectively. Furthermore, the step of obtaining the frequency of the second audio signal from the frequency group further includes: after obtaining the frequency of the first audio signal, obtaining the frequency of the second audio signal from the frequency group according to the frequency-hopping sequence and the logic level of the second digital signal; wherein the frequency group includes a first frequency, a second frequency and a third frequency, and the frequency-hopping sequence of the frequency group is determined by the logic level of the first digital signal.

In some embodiments, when the first and second digital signals have the first logic level, the frequency of the first audio signal is the first frequency, and the frequency-hopping sequence circulates between the first, second and third frequencies in the first direction so as to obtain the second frequency as the frequency of the second audio frequency. When the first digital signal has the first logic level and the second digital signal has the second logic level, the frequency of the first audio signal is the first frequency, and the frequency-hopping sequence circulates in the first direction so as to obtain the third frequency as the frequency of the second audio frequency.

When the first and second digital signals have the second logic level, the frequency of the first audio signal is the second frequency, and the frequency-hopping sequence circulates between the second, first and third frequencies in the second direction so as to obtain the first frequency as the frequency of the second audio frequency. When the first digital signal has the second logic level and the second digital signal has the first logic level, the frequency of the first audio signal is the second frequency and the frequency-hopping sequence circulates in the second direction so as to obtain the third frequency as the frequency of the second audio frequency, wherein the first direction is opposite to the second direction.

In some embodiments, the step of obtaining the frequency of the second audio signal from the frequency group further includes: obtaining a first frequency of the first audio signal, wherein the frequency group includes the first frequency, a second frequency and a third frequency; comparing the second and third frequencies to obtain a comparison result; and obtaining the second frequency or the third frequency from the frequency group as the frequency of the second audio signal according to the comparison result and a logic level of the second digital signal of the instruction. Furthermore, the first audio signal and the second audio signal from the transmitter of a transmitting apparatus of the communication system are sequentially received by the receiver of a receiving apparatus of the communication system. Moreover, the receiver is a microphone, and the transmitter is a speaker or a piezo-buzzer.

While the invention has been described by way of example and in terms of the embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication system, comprising:
    a receiving apparatus, comprising:
        a receiver, receiving a plurality of audio signals, wherein a frequency of each of the audio signals is selected from a frequency group formed by at least three frequencies;
        a signal detector coupled to the receiver, obtaining the frequency of each of the audio signals; and
        a first processor coupled to the signal detector, converting the frequency of each of the audio signals into a digital signal having a first logic level or a second logic level,
        wherein two adjacent audio signals of the audio signals have different frequencies, and at least one frequency of the frequency group is used to dynamically represent the first logic level or the second logic level,
        wherein the receiver receives a first audio signal and a second audio signal in sequence, and the first processor obtains a first digital signal and a second digital signal according to the first audio signal and the second audio signal, wherein the frequency group comprises a first frequency, a second frequency and a third frequency, wherein the second frequency is higher than the third frequency, and the frequency of the first audio signal is the first frequency, and when the frequency of the second audio signal is the second frequency, the second digital signal has the first logic level, and when the frequency of the second audio signal is the third frequency, the second digital signal has the second logic level.

2. The communication system as claimed in claim 1, wherein the first processor converts the first audio signal and the second audio signal into the first digital signal and the second digital signal, wherein when the second digital signal is a data bit, the first digital signal is a data bit or a synchronization bit, and when the second digital signal is a synchronization bit, the first digital signal is a synchronization bit or a header bit, and the receiving apparatus obtains information from a transmitting apparatus according to the first and second digital signals, wherein the first digital signal is a first signal of the information and the second digital signal is a second signal of the information.

3. The communication system as claimed in claim 1, further comprising:
    a transmitting apparatus,
    wherein the first processor converts the first audio signal and the second audio signal into the first digital signal and the second digital signal,
    wherein the transmitting apparatus comprises:
        a second processor, providing information comprising the first digital signal and the second digital signal;
        a signal generator coupled to the second processor, receiving the information, and sequentially generating the first audio signal and the second audio signal according to the logic levels of the first digital signal and the second digital signal; and
        a transmitter coupled to the signal generator, sequentially providing the first audio signal and the second audio signal to the receiving apparatus.

4. The communication system as claimed in claim 3, wherein the signal generator obtains the first frequency from the frequency group as the frequency of the first audio signal in response to the logic level of the first digital signal, wherein when the second digital signal has the first logic level, the signal generator obtains the second frequency from the frequency group as the frequency of the second audio signal, and the second frequency is higher than the third frequency, and when the second digital signal has the second logic level, the signal generator obtains the third frequency from the frequency group as the frequency of the second audio signal, and the third frequency is lower than the second frequency.

5. The communication system as claimed in claim 3, wherein the transmitter is a speaker, a buzzer or a beeper.

6. The communication system as claimed in claim 1, wherein the receiver is a microphone.

7. A signal transfer method for a communication system, comprising:

obtaining a frequency of a first audio signal from a frequency group according to a first digital signal; and obtaining a frequency of a second audio signal from the frequency group according to a second digital signal;

wherein at least one frequency of the frequency group is used to dynamically represent the first digital signal or the second digital signal, and when the first and second audio signals are two adjacent audio signals, the first and second audio signals have different frequencies, wherein the first and second audio signals are two audio signals that are present at different time points, wherein the first and second audio signals are not adjacent to each other and have the same frequencies corresponding to a first logic level and a second logic level, respectively, wherein the step of obtaining the frequency of the second audio signal from the frequency group further comprises:

obtaining a first frequency of the first audio signal, wherein the frequency group comprises the first frequency, a second frequency and a third frequency;

comparing the second and third frequencies to obtain a comparison result; and obtaining the second frequency or the third frequency from the frequency group as the frequency of the second audio signal according to the comparison result and a logic level of the second digital signal.

8. The signal transfer method as claimed in claim 7, further comprising:

sequentially receiving the first audio signal and the second audio signal from a transmitter of a transmitting apparatus of the communication system by a receiver of a receiving apparatus of the communication system.

9. The signal transfer method as claimed in claim 7, wherein when the second digital signal is a data bit, the first digital signal is a data bit or a synchronization bit, and when the second digital signal is a synchronization bit, the first digital signal is a synchronization bit or a header bit, wherein the first digital signal is a first signal of information from a transmitter and the second digital signal is a second signal of the information.

10. A communication system, comprising:

a transmitting apparatus comprising:

a processor, providing information regarding a first digital signal and a second digital signal;

a signal generator coupled to the processor, receiving the information and generating a plurality of audio signals according to the information, wherein a frequency of each of the audio signals is selected from a frequency group formed by at least three frequencies; and a transmitter, sequentially transmitting the audio signals to a receiving apparatus;

wherein two adjacent audio signals of the audio signals have different frequencies, and at least one frequency of the frequency group is used to dynamically represent a first logic level or a second logic level, wherein the signal generator generates a first audio signal and a second audio signal in sequence according to the first digital signal and the second digital signal, the frequency group comprises a first frequency, a second frequency and a third frequency, wherein the second frequency is higher than the third frequency, and the frequency of the first audio signal is the first frequency, and when the second digital signal has the first logic level, the frequency of the second audio signal is the second frequency, and when the second digital signal has the second logic level, the frequency of the second audio signal is the third frequency.

* * * * *